United States Patent [19]

Tokunaga

[11] Patent Number: 5,362,687
[45] Date of Patent: Nov. 8, 1994

[54] LEAD-FREE FRIT GLAZE

[75] Inventor: Yasuyuki Tokunaga, Nagoya, Japan

[73] Assignee: Narumi China Corporation, Nagoya, Japan

[21] Appl. No.: 12,871

[22] Filed: Feb. 3, 1993

[30] Foreign Application Priority Data

Feb. 4, 1992 [JP] Japan .................. 4-054270
Jan. 22, 1993 [JP] Japan .................. 5-027221

[51] Int. Cl.$^5$ .................. C03C 8/02; C03C 3/091
[52] U.S. Cl. .................. 501/21; 501/66
[58] Field of Search .................. 501/21, 66

[56] References Cited

U.S. PATENT DOCUMENTS

| | | | |
|---|---|---|---|
| 2,972,543 | 2/1961 | Beals et al. | 501/21 X |
| 4,084,976 | 4/1978 | Hinton | 501/26 X |
| 4,120,733 | 10/1978 | Knapp | 501/26 X |
| 4,282,035 | 8/1981 | Nigrin | 501/32 X |
| 4,316,963 | 2/1982 | Hommel | 501/21 X |
| 4,814,298 | 3/1989 | Nelson et al. | 501/17 |
| 5,204,291 | 4/1993 | Nigrin | 501/21 |
| 5,219,801 | 6/1993 | Shorrock et al. | 501/66 |
| 5,264,398 | 11/1993 | Thometzek et al. | 501/21 |

FOREIGN PATENT DOCUMENTS

| | | |
|---|---|---|
| 4102556A1 | 1/1991 | Germany . |
| 1-153554 | 10/1988 | Japan . |
| 4-325440 | 1/1991 | Japan . |
| 4-349144 | 5/1991 | Japan . |
| 1452484 | 10/1976 | United Kingdom . |

*Primary Examiner*—Mark L. Bell
*Assistant Examiner*—David R. Sample
*Attorney, Agent, or Firm*—Oblon, Spivak, McClelland, Maier & Neustadt

[57] ABSTRACT

A lead-free frit glaze consisting of, by mole %, 61% or greater $SiO_2$, 8–10% $Al_2O_3$, 0.1–3% CaO, 0.1–2% MgO, 2–5% $Li_2O$, 1–4% $K_2O$, 2–6% $Na_2O$, and 10–15% $B_2O_3$. The glaze is applied over the surface of ceramic biscuit base and fired therewith. Although the glaze contains no lead, the lead-free frit glaze provides excellent gloss and excellent quick cooling resistance.

2 Claims, No Drawings

LEAD-FREE FRIT GLAZE

BACKGROUND OF THE INVENTION

1. Field of the Invention

The present invention relates to a lead-free frit glaze having excellent gloss and cooling resistance.

2. Description of the Related Arts

Ceramics are conventionally produced by firing natural clay and/or pottery at high temperature. Generally, clay is first mixed with water and subjected to grinding and kneading. The clay-water mixture is then filtered to reduce the amount of water contained therein, resulting in the formation of a base body. The base body is subjected to biscuit firing to provide a biscuit base, and is coated with a frit glaze. After glost firing, the glazed ceramic article obtained is cooled. The frit glaze is coated on the surface of the ceramic to improve its surface gloss, water resistance, and cooling resistance.

Conventional frit glazes contain lead (Pb) in an amount ranging from several percent to over 10% by weight because it is easily vitrified due to its low melting temperature. Further, lead has excellent flow properties which facilitate the above described process for manufacturing ceramics. Lead also improves the coloring and gloss of the ceramic surface after firing.

Unfortunately, in order to produce the above-described frit glaze, red lead or white lead are indispensable ingredients. These materials are hazardous in that they cause air pollution. Moreover, the contact of only a very small amount of these lead ingredients with the drainage water and spray water used during glaze application is unavoidable, resulting in water contamination. Clearly, the development of a lead-free frit glaze which would avoid such pollution is desired in this art.

SUMMARY OF THE INVENTION

It is an object of the present invention to provide a lead-free frit glaze having excellent gloss and cooling resistance.

Another object of the present invention is to provide a ceramic article coated with a lead-free frit glaze.

The above objects have been attained by providing a lead-free frit glaze comprising, in mole %, 61% or more of $SiO_2$, 8–10% of $Al_2O_3$, 0.1–3% of CaO, 0.1–2% of MgO, 2–5% of $Li_2O$, 1–4% of $K_2O$, 2–6% of $Na_2O$, and 10–15% of $B_2O_3$.

DETAILED DESCRIPTION OF THE INVENTION

As described above, the present invention lead-free frit glaze contains certain amounts of $SiO_2$, $Al_2O_3$, CaO, MgO, $Li_2O$, $K_2O$, $Na_2O$ and $B_2O_3$. The benefits obtained when a glaze is provided having these components in the invention amounts is explained hereinafter.

If the lead-free frit glaze contains less than 61 mole % of $SiO_2$ (unless otherwise specified, all percentages hereinafter described will be in mole percent), the chemical resistance of the resulting frit is decreased. However, the invention frit glaze preferably contains 65% or less $SiO_2$ to provide a smooth ceramic surface.

When the invention lead-free frit glaze contains less than 8% $Al_2O_3$, a big bubble is liable to be generated on firing. If $Al_2O_3$ is present in excess of 10%, the viscosity of the melted glaze is increased and the surface gloss of the frit is deteriorated. When the invention lead-free frit glaze contains less than 0.1% CaO, a burst bubble is liable to be generated during firing. If CaO is present in excess of 3%, the ceramic surface may be roughened, like an eggshell surface. When the invention lead-free frit glaze contains less than 0.1% MgO or MgO in excess of 2%, a burst bubble is liable to be generated. When the invention lead-free frit glaze contains less than 2% $Li_2O$, the ceramic surface may be toughened, like a seed or eggshell surface. If $Li_2O$ is present in excess of 5%, a burst bubble is liable to be generated. When the invention lead-free frit glaze contains less than 1% $K_2O$, or $K_2O$ is present in excess of 4%, the ceramic surface may be toughened like a seed or eggshell surface. Similarly, when the invention lead-free frit glaze contains less than 2% $Na_2O$, or $Na_2O$ is present in excess of 6%, the ceramic surface may be roughened, like a seed or eggshell surface.

When the invention lead-free frit glaze contains less than 10% $B_2O_3$, the viscosity of the glaze is increased, and the smoothness and gloss of the ceramic surface is deteriorated. If $B_2O_3$ is present in excess of 15%, a burst bubble is liable to be generated.

The frit glaze of the present invention is obtained by mixing glass frit ingredients and natural ingredients (for example, clay) to provide a mixture having a ratio of components as specified above. The glass frit ingredients can be formed by mixing kaolin, limestone, magnesite, lithium carbonate, potassium carbonate, sodium carbonate, boric acid, and flint ($SiO_2$ powder) in the appropriate composition ratio. The mixture is then subjected to firing and then to quick cooling in water to obtain a glass. The obtained glass is dried and crushed into fine particles, resulting in the glass frit material. Any other method of providing the composition described above may also be used. For example, mixing the pure ingredients listed above ($SiO_2$, $Al_2O_3$, CaO, etc.) in the proper ratios is effective for providing the invention lead-free frit glaze.

The glass frit material and the natural material (i.e., clay) are mixed in a predetermined composition ratio to provide a lead-free frit glaze having component amounts as described above. Then, water is added to the mixture to make a slurry. The slurry is then applied to a biscuit base and glost fired.

The invention frit glaze slurry may be applied through a spray gun, or by submerging the biscuit base into the frit glaze fluid. The slurry may also be applied to the biscuit base by using a brush.

The lead-free frit glaze of the present invention, containing no lead (Pb), contains $SiO_2$, $Al_2O_3$, CaO, MgO, $Li_2O$, $K_2O$, $Na_2O$, and $B_2O_3$, which ingredients are mixed in the aforementioned composition ratio. The glaze is applied to a ceramic surface to be fired, and provides a ceramic with excellent gloss and quick cooling resistance.

Having generally described this invention, a further understanding can be obtained by reference to certain specific examples which are provided herein for purposes of illustration only and are not intended to be limiting unless otherwise specified.

EXAMPLES

Example 1

In this Example, a lead-free frit glaze of the present invention consisting of 64.3% $SiO_2$, 9.4% $Al_2O_3$, 2.2% CaO, 1.1% MgO, 2.3% $Li_2O$, 3.0% $K_2O$, 4.6% $Na_2O$, and 13.1% $B_2O_3$. This lead-free frit glaze was obtained by mixing 85 wt. % of glass frit material (described below) and 15 wt. % of a clay as natural ingredient, and adding water thereto to form a slurry.

The glass frit material consists of, by weight, 20.9% kaolin, 2.9% limestone, 1.7% magnesite, 2.3% lithium carbonate, 5.7% potassium carbonate, 6.7% sodium carbonate, 22.4% boric acid, and 37.4% flint ($SiO_2$ powder). The specified amount of the above ingredients were mixed and the powdered mixture was fired at a temperature ranging from 1350° C. to 1400° C. The fired mixture was subjected to quick cooling in water to obtain a glass. The obtained glass was dried and crushed into fine particles, resulting in the glass frit material.

The above formed lead-free frit glaze was sprayed over a biscuit base through a spray gun so as to coat the ceramic surface thereof. Then the coated base was fired at 1150° C to form the glaze layer on the ceramic surface. Bone china was used as the biscuit base.

The glaze layer obtained was measured for its refractive index and coefficient of thermal expansion, and values of 1.517 and $6.5 \times 10^{-6}/°$ C. (0° C.–400° C.), respectively were obtained. The glaze layer had excellent gloss and provided excellent cooling resistance.

Example 2

In this Example, a lead-free frit glaze of the present invention is provided consisting of 64.3% $SiO_2$, 8.5% $Al_2O_3$, 2.0% CaO, 1.4% MgO, 4.2% $Li_2O$, 2.7% $K_2O$, 2.9% $Na_2O$, and 14.0% $B_2O_3$.

The above-described lead–free frit glaze was obtained by mixing 91 wt. % of the glass frit material (below) and 9 wt. % of a natural ingredient, clay, and water was added thereto to form a slurry.

The glass frit material consists of, by weight, 22.5% kaolin, 2.6% limestone, 1.6% magnesite, 4.2% lithium carbonate, 5.0% potassium carbonate, 4.2% sodium carbonate, 23.3% boric acid, and 36.6% flint. The specified amounts of the above ingredients were mixed together. The powdered mixture was fired at a temperature ranging from 1350° C. to 1400° C. and subjected to quick cooling in water to obtain a glass. The glass was dried and crushed into fine particles, resulting in the glass frit material. This material was mixed with clay and water to form a lead-free frit glaze slurry, and the above formed lead-free frit glaze slurry was sprayed over a bone china biscuit base through a spray gun so as to coat the ceramic surface thereof. The coated biscuit base was fired at 1150° C. to form the glaze layer on the ceramic surface.

The glaze layer was measured for its refractive index (1.513) and coefficient of thermal expansion ($6.3 \times 10^{-6}/°$ C. (0° C.–400° C.)). The glazed ceramic had excellent gloss and provided excellent quick cooling resistance.

Examples 3–8, Comparative Examples C1–C6

Various types of the lead-free frit glazes according to the present invention were produced according to the method of Example 1 and are described in Table 1 as Examples 3–8. These lead-free frit glazes were applied to ceramics and fired to form a glaze layer as in Example 1. Table 1 shows the coefficient of thermal expansion of the glaze layer for Examples 3–8. The surface gloss and quick cooling resistance of each Example were also evaluated and found to be excellent in every case.

For comparative purposes, 6 types of lead-free frit glaze with varied composition were formed as Comparative Examples C1–C6 (Table 2). The Comparative examples have several ingredients whose amounts departed from the specified limits of the invention composition ratios. Other features are the same as those of Examples 3–8. Table 2 shows the measured coefficient of thermal expansion of the glaze layer in Comparative Examples C1–C6. In this table, the ingredient marked with a (+) is the ingredient contained in an amount over the invention limit. The ingredient marked with a (−) is the ingredient contained in an amount under the invention limit.

As Table 1 shows, each coefficient of thermal expansion for Examples 3–8 has a relatively low value ranging from $5.76 \times 10_{-6}/°$ C. to $7.13 \times 10_{-6}/°$ C. (0° C.–400° C.), which values prevent crazing normally occurring with a sharp decrease in temperature upon quick cooling. Each glaze layer obtained in Examples 3–8 contained no lead, and had excellent surface gloss and excellent quick cooling resistance.

As Table 2 shows, the glaze layer of Comparative Example C1 presented excellent gloss property, however, the glaze, when fired, was deposited to form a thick part where the bubble was generated. Glaze layer C2 provided a surface which was roughened, as an eggshell, thus deteriorating surface gloss. In C3, the lead-free frit glaze melted only slightly. After firing, ripple-like wrinkles were formed on the surface of the glaze layer. In C4, a bubble was generated on the surface of the glaze layer and in C5, the glaze layer provided a smooth gloss surface, but its coefficient of thermal expansion measured $7.8 \times 10_{-6}/°$ C. (0° C.–400° C.), and the ceramic underwent crazing when the temperature was rapidly lowered by 100° C. In C6, the lead-free frit glaze melted only slightly, causing a wrinkle on the surface of the glaze layer after firing.

TABLE 1

| Composition | Examples | | | | | |
|---|---|---|---|---|---|---|
| | 3 | 4 | 5 | 6 | 7 | 8 |
| $SiO_2$ | 66.6 | 64.3 | 64.3 | 64.4 | 63.5 | 64.8 |
| $Al_2O_3$ | 8.1 | 8.7 | 9.2 | 9.4 | 9.9 | 8.8 |
| CaO | 0.1 | 2.4 | 1.2 | 2.2 | 2.4 | 2.3 |
| MgO | 1.9 | 1.4 | 1.0 | 1.1 | 1.3 | 0.9 |
| $Li_2O$ | 4.4 | 4.6 | 2.2 | 2.3 | 4.5 | 2.0 |
| $K_2O$ | 2.9 | 2.4 | 3.5 | 3.0 | 2.4 | 3.4 |
| $Na_2O$ | 2.3 | 2.2 | 5.5 | 4.6 | 2.2 | 5.0 |
| $B_2O_3$ | 13.7 | 14.0 | 13.0 | 13.0 | 13.8 | 12.8 |
| Coefficient of thermal expansion ($\times 10^{-6}/°C.$) | 5.76 | 5.98 | 7.13 | 6.53 | 6.10 | 7.09 |

TABLE 2

| Composition | Comparative Examples | | | | | |
|---|---|---|---|---|---|---|
| | C1 | C2 | C3 | C4 | C5 | C6 |
| $SiO_2$ | 63.1 | 64.1 | 64.4 | 64.3 | 64.2 | 65.0 |
| $Al_2O_3$ | 7.1(−) | 7.6(−) | 7.7(−) | 7.7(−) | 8.9 | 8.2 |
| CaO | 2.6 | 3.5(+) | 2.0 | 3.6(+) | 0.3 | 3.6(+) |
| MgO | 1.4 | 1.6 | 0(−) | 0(−) | 1.0 | 0.1 |
| $Li_2O$ | 5.5(+) | 3.8 | 3.8 | 3.9 | 2.2 | 3.7 |
| $K_2O$ | 2.6 | 2.3 | 0.8(−) | 3.9 | 3.9 | 0.8(−) |
| $Na_2O$ | 2.4 | 1.9(−) | 6.4(+) | 1.6(−) | 6.3(+) | 4.6 |

TABLE 2-continued

| Composition | Comparative Examples | | | | | |
|---|---|---|---|---|---|---|
| | C1 | C2 | C3 | C4 | C5 | C6 |
| $B_2O_3$ | 15.3(+) | 15.2(+) | 14.9 | 15.0 | 13.2 | 14.0 |
| Coefficient of thermal expansion ($\times 10^{-6}$/°C.) | 6.02 | 5.82 | 6.76 | 6.47 | 7.80 | 6.43 |

Example 9

In this Example, the diffuse reflectance of the lead-free frit glaze made and used in Example 2 was measured in order to evaluate the surface gloss. The diffuse reflectance of two types of lead-free frit glazes containing bismuth which were produced and sold by a certain company in Japan, Samples A1 and A2, and two other types of frit glaze containing lead produced by applicant's company, Samples A3 and A4, were also measured in the same way as the material of Example 2. Samples A1–A4 are typical frit glazes which are conventionally used.

Table 3 shows the results obtained. As the data in this table shows, the diffuse reflectance of the glaze layer of the lead-free frit glaze of the present invention was similar or superior to those of Samples A1–A4. Accordingly, the glaze layer of the present invention has an excellent gloss, contains no lead, and is as good as, or better than, glazes which are conventionally used.

| | | Diffuse reflectance (%) |
|---|---|---|
| | Example 2 | 82.4 |
| Lead-free | Sample A1 | 81.3 |
| | Sample A2 | 81.4 |
| Lead | Sample A3 | 81.8 |
| | Sample A4 | 82.5 |

While the present invention has been described with reference to the examples, it is to be understood that modifications may be easily made by a person of ordinary skill in the art without departing from the spirit or scope of the invention as set forth herein.

What is claimed as new and desired to be secured by Letters Patent of the United States is:

1. A lead-free frit glaze composition consisting of, in mole % 61–66.6% $SiO_2$, 8–10% of $Al_2O_3$, 0.1–3% of CaO, 0.1–2% of MgO, 2–5% of $Li_2O$, 1–4% of $K_2O$, 2–4.6% of $Na_2O$, and 10–15% of $B_2O_3$.

2. A lead-free frit glaze composition according to claim 1, wherein said lead-free frit glaze composition has a coefficient of thermal expansion measured from 0°–400° C. ranging from $5.76 \times 10^{-6}$/° C. to $7.13 \times 10^{-6}$/° C. after being applied to a ceramic and fired.

* * * * *